US012530843B2

(12) United States Patent
Mizuta et al.

(10) Patent No.: US 12,530,843 B2
(45) Date of Patent: Jan. 20, 2026

(54) VIRTUAL SPACE PRESENTATION DEVICE

(71) Applicant: NTT DOCOMO, INC., Tokyo (JP)

(72) Inventors: Reo Mizuta, Chiyoda-ku (JP); Yasuo Morinaga, Chiyoda-ku (JP); Mitsuhiro Goto, Chiyoda-ku (JP); Tatsuya Nishizaki, Chiyoda-ku (JP); Yuki Nakamura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 177 days.

(21) Appl. No.: 18/693,606

(22) PCT Filed: Aug. 22, 2022

(86) PCT No.: PCT/JP2022/031593
§ 371 (c)(1),
(2) Date: Mar. 20, 2024

(87) PCT Pub. No.: WO2023/047865
PCT Pub. Date: Mar. 30, 2023

(65) Prior Publication Data
US 2024/0394966 A1 Nov. 28, 2024

(30) Foreign Application Priority Data
Sep. 27, 2021 (JP) .................................. 2021-156433

(51) Int. Cl.
*G06T 17/00* (2006.01)
*G06F 3/01* (2006.01)
*H04N 13/279* (2018.01)

(52) U.S. Cl.
CPC .............. *G06T 17/00* (2013.01); *G06F 3/012* (2013.01); *H04N 13/279* (2018.05)

(58) Field of Classification Search
CPC .......... G06F 3/012; G06F 3/011; G06F 3/013; G06F 3/01; H04N 13/279; G09G 5/36; G09G 5/00; G06T 17/00
See application file for complete search history.

(56) References Cited

U.S. PATENT DOCUMENTS 11,250,617 B1 * 2/2022 Sempe ................... H04L 65/611
2019/0147664 A1 * 5/2019 Watanabe ........... G06F 3/04883
345/633

(Continued)

FOREIGN PATENT DOCUMENTS

JP          2011-203860 A       10/2011

OTHER PUBLICATIONS

International Search Report mailed on Oct. 4, 2022 in PCT/JP2022/031593 filed on Aug. 22, 2022, 2 pages.

(Continued)

*Primary Examiner* — Xilin Guo
(74) *Attorney, Agent, or Firm* — Oblon, McClelland, Maier & Neustadt, L.L.P.

(57) ABSTRACT

A server of an embodiment includes a virtual space generation unit configured to generate a virtual space that includes a user's virtual viewpoint therein and in which virtual content is disposed, a detection unit configured to detect an orientation of an HMD worn on the user's head to display a portion of the virtual space which is visible from the virtual viewpoint, a display control unit configured to control a display direction of the content disposed in a target region in the virtual space to make a vertical direction of the content and a vertical direction of the HMD coincide with each other, a posture determination unit configured to determine the user's posture on the basis of a state of the HMD, and a region control unit configured to determine a range of the (Continued)

target region in accordance with the user's posture determined by the posture determination unit.

9 Claims, 14 Drawing Sheets

(56) References Cited

U.S. PATENT DOCUMENTS

| | | | | |
|---|---|---|---|---|
| 2022/0091722 | A1* | 3/2022 | Faulkner | G06F 3/04815 |
| 2022/0137705 | A1* | 5/2022 | Hashimoto | G06F 1/1694 |
| | | | | 345/156 |
| 2022/0317462 | A1* | 10/2022 | Kondo | G06F 3/016 |
| 2023/0015019 | A1* | 1/2023 | Kavallierou | H04N 21/440245 |
| 2023/0247184 | A1* | 8/2023 | Mashitani | H04N 9/3185 |
| | | | | 348/744 |

OTHER PUBLICATIONS

International Preliminary Report on Patentability and Written Opinion issued Apr. 11, 2024 in PCT/JP2022/031593 (submitting English translation only), 5 pages.

* cited by examiner

VIRTUAL SPACE PRESENTATION DEVICE

TECHNICAL FIELD

One aspect of the present invention relates to a virtual space presentation device.

BACKGROUND ART

Patent Literature 1 discloses a display switching method of acquiring image data of the face of a user who is using an information terminal such as a smartphone, determining the vertical direction of the face on the basis of the image data, and switching the display direction of content so that the vertical direction of the content displayed on a display unit and the vertical direction of the face coincide with each other.

CITATION LIST

Patent Literature

[Patent Literature 1] Japanese Unexamined Patent Publication No. 2011-203860

SUMMARY OF INVENTION

Technical Problem

Applying the above mechanism to a system that provides a user with an image of a virtual space in which a plurality of pieces of content are disposed through a head-mounted display can be considered. However, a large amount of content may be disposed in the virtual space. For this reason, in a case where display control is performed so that the display direction of all content always coincides with the vertical direction of a user's face (that is, the vertical direction of the head-mounted display), the amount of calculation increases, which may lead to occurrence of problems such as depletion of calculation resources and processing failures. On the other hand, when content whose display direction is to be controlled is limited too much, there may be concern of user convenience being impaired.

Consequently, one aspect of the present invention aims to provide a virtual space presentation device capable of achieving a reduction in the amount of calculation while maintaining user convenience.

Solution to Problem

According to one aspect of the present invention, there is provided a virtual space presentation device including: a virtual space generation unit configured to generate a virtual space that includes a user's virtual viewpoint therein and in which virtual content is disposed; a detection unit configured to detect an orientation of a head mounted display worn on the user's head to display a portion of the virtual space which is visible from the virtual viewpoint; a display control unit configured to control a display direction of the content disposed in a target region in the virtual space to make a vertical direction of the content and a vertical direction of the head mounted display coincide with each other; a posture determination unit configured to determine the user's posture on the basis of a state of the head mounted display; and a region control unit configured to determine a range of the target region in accordance with the user's posture determined by the posture determination unit.

In the virtual space presentation device according to one aspect of the present invention, the display direction of only the content disposed in the target region among the content disposed in the virtual space is controlled so that the vertical direction of the content and the vertical direction of the head-mounted display coincide with each other. In this way, by limiting the range of the content (target region) whose display direction is to be controlled, it is possible to achieve a reduction in the amount of calculation required for display control. In addition, by controlling the range of the target region in accordance with the user's posture determined on the basis of the state of the head-mounted display, it is possible to appropriately set the range of content which is a target for display control in accordance with the user's posture, and to maintain user convenience.

Advantageous Effects of Invention

According to one aspect of the present invention, it is possible to provide a virtual space presentation device capable of achieving a reduction in the amount of calculation while maintaining user convenience.

DESCRIPTION OF EMBODIMENTS

Figure 1:
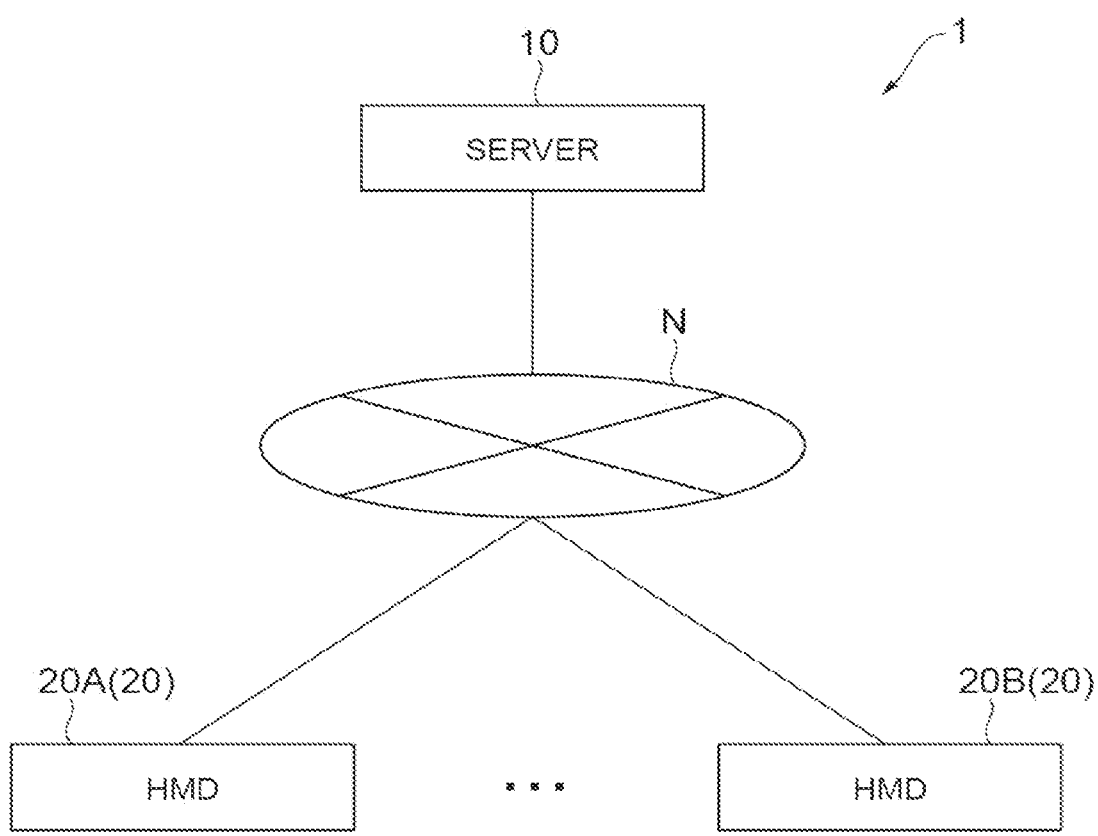
FIG. 1 is a diagram illustrating an example of an overall configuration of a virtual space presentation system according to an embodiment.

Hereinafter, an embodiment of the present invention will be described in detail with reference to the accompanying drawings. Meanwhile, in the description of the drawings, the same or equivalent components are denoted by the same reference numerals and signs, and thus description thereof will not be repeated.

FIG. 1 is a diagram illustrating an example of a virtual space presentation system 1 according to an embodiment.

The virtual space presentation system 1 is a computer system that provides a virtual space to a user. As an example, the virtual space presentation system 1 is configured to include a server 10 (virtual space presentation device) and head-mounted displays (HMDs) 20 which are user terminals used by users. Although two HMDs 20A and 20B are shown in FIG. 1, the number of HMDs 20 included in the virtual space presentation system 1 is not limited to the above. That is, the number of HMDs 20 included in the virtual space presentation system 1 may be one, or may be three or more.

The server 10 generates a virtual space in which virtual content is disposed, and delivers a virtual space image indicating the virtual space to the HMD 20 of each user. The content is display information indicating arbitrary information. The content can be configured as, for example, a still image or a moving image. The server 10 is communicably connected to each of the HMDs 20 through a communication network N. The configuration of the communication network N is not limited. For example, the communication network N may be configured to include the Internet, or may be configured to include an intranet.

The HMD 20 is a device worn on a user's head. The form of the HMD 20 is not limited to a specific form. The HMD 20 can take various forms such as, for example, a goggle type, a glass type (spectacles type), and a hat type. The HMD 20 is smart glasses such as, for example, XR glasses. In the present embodiment, the HMD 20 is AR glasses having a function of providing augmented reality (AR) to a user. For example, the HMD 20 is a see-through type of glasses configured to allow a user to visually recognize a virtual space as well as the real space (the outside world). However, the HMD 20 is not limited to the above, and may be an MR device such as MR glasses having a function of providing mixed reality (MR) to a user, or may be a VR device such as VR glasses having a function of providing virtual reality (VR) to the user.

Figure 2:
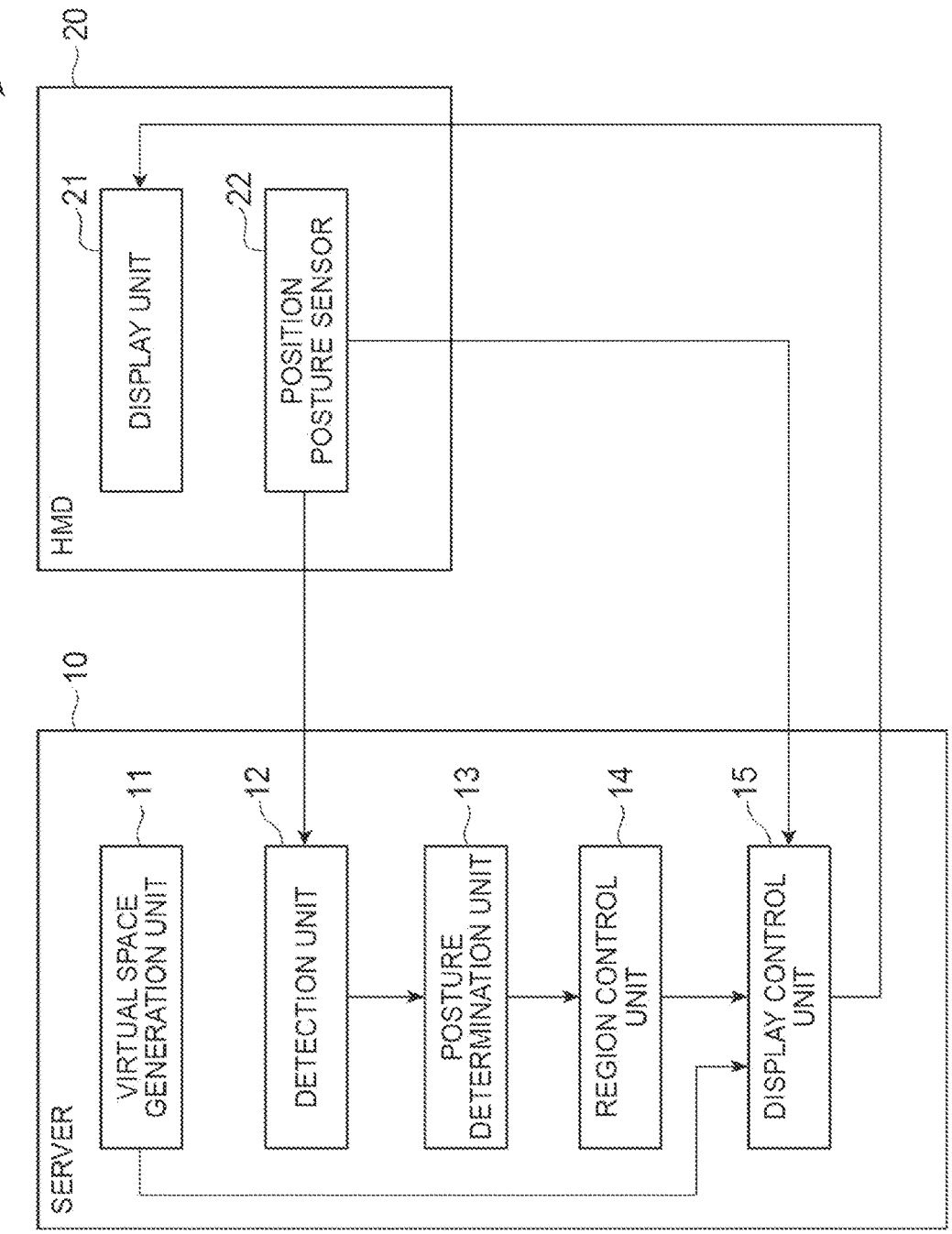
FIG. 2 is a diagram illustrating an example of a functional configuration of the virtual space presentation system.

FIG. 2 is a diagram illustrating an example of a functional configuration of the virtual space presentation system 1. As shown in FIG. 2, the HMD 20 includes a display unit 21 and a position posture sensor 22.

The display unit 21 is a display which is disposed in front of the user's eyes. The display unit 21 is constituted by, for example, a liquid crystal display element, an organic electro luminescence (EL) element, or the like. The display unit 21 may separately include a display panel for the right eye which is disposed in front of the user's right eye and a display panel for the left eye which is disposed in front of the user's left eye. A virtual space image delivered from the server 10 is displayed on the display unit 21.

The position posture sensor 22 detects the posture (orientation) and height position of the HMD 20. The position posture sensor 22 is constituted by, for example, an acceleration sensor, a gyro sensor, a GPS sensor, or the like. Posture information relating to the posture of the HMD 20 and position information relating to the height position of the HMD 20 detected by the position posture sensor 22 are periodically transmitted to the server 10, for example, at predetermined time intervals.

As shown in FIG. 2, the server 10 includes a virtual space generation unit 11, a detection unit 12, a posture determination unit 13, a region control unit 14, and a display control unit 15.

The virtual space generation unit 11 generates a virtual space. Virtual space information required for generating a virtual space (such as, for example, information indicating the details and position of content to be disposed in a virtual space) is stored in advance in a storage unit of the server 10 (such as, for example, a storage 1003 to be described later). Alternatively, the virtual space generation unit 11 may acquire (download) virtual space information from a device different from the server 10 (such as, for example, an external server communicably connected to the server 10 through the communication network N). The virtual space generation unit 11 generates a virtual space on the basis of such virtual space information.

An example of a virtual space (a virtual space 50) generated by the virtual space generation unit 11 will be described with reference to FIG. 3. The virtual space 50 includes a user's virtual viewpoint 51 therein. The virtual viewpoint 51 corresponds to the viewpoint of a user who views the virtual space 50 through the display unit 21. That is, an image showing a portion of the virtual space 50 (virtual space image) which is visible to the user from the virtual viewpoint 51 is displayed on the display unit 21. As a result, the user can feel as if he or she exists in the virtual space 50 as a virtual user 100 shown in FIG. 3.

As an example, the virtual space 50 is configured as a spherical space centered on the virtual viewpoint 51, and the vertical direction of the virtual space 50 is set to coincide with the vertical direction of the real space. That is, as shown in FIG. 3, the direction from the virtual viewpoint 51 toward a zenith portion P1 of the virtual space 50 coincides with the vertically upward direction in the real space, and the direction from the virtual viewpoint 51 toward a nadir portion P2 of the virtual space 50 coincides with the vertically downward direction in the real space.

In the present embodiment, for convenience, the vertical direction of the virtual space 50 (that is, the direction passing through the zenith portion P1 and the nadir portion P2 and coinciding with the vertical direction of the real space) is denoted as a Z-axis direction. In addition, one direction along the horizontal plane of the virtual space 50 (that is, a direction parallel to the horizontal direction of the real space) and orthogonal to the Z-axis direction is denoted as an X-axis direction. In addition, a direction orthogonal to both the X-axis direction and the Z-axis direction is denoted as a Y-axis direction.

Figure 3:
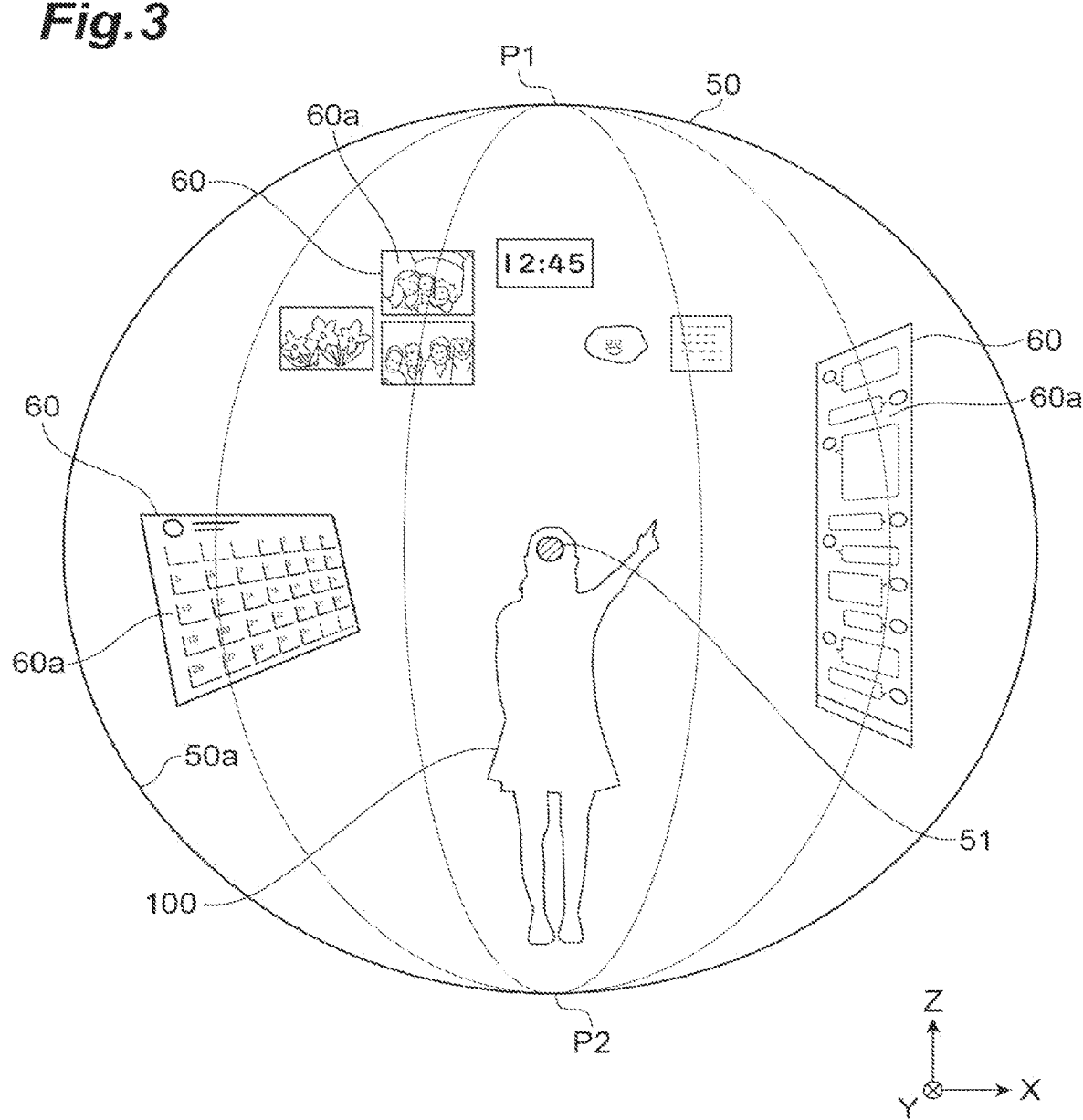
FIG. 3 is a diagram schematically illustrating an example of a virtual space.

As shown in FIG. 3, the virtual space 50 has one or more pieces of content 60 disposed along a spherical surface 50a centered on the virtual viewpoint 51. In the present embodiment, the spherical surface 50a functions as a virtual omnidirectional display centered on the virtual viewpoint 51. That is, the user can construct his or her own work space by freely disposing one or more pieces of content 60 at positions located along the spherical surface 50a. More specifically, the user can newly generate (dispose) the content 60 at a position located along the spherical surface 50a, change the position of the content 60, change (enlarge or reduce) the size of the content 60, or delete the content 60. That is, various pieces of content can be disposed in the virtual space 50 (in the present embodiment, a position located along the spherical surface 50a) in accordance with the user's preference.

Each piece of content 60 has a display surface 60a for displaying the details of the content. Each piece of content 60 is disposed so that the display surface 60a faces the center of the virtual space 50 (that is, the virtual viewpoint 51). Specific examples of the content 60 include display information indicating the user's schedule, display information indicating a photo image selected by the user, display information indicating the screen of a predetermined application (for example, an application that provides a chat function), display information indicating the screen of a Web browser, and the like. However, the type of content 60 is not limited to the above.

In the present embodiment, as an example, the HMD 20 supports three degrees of freedom (3DoF). That is, even though the user (that is, the HMD 20 worn on the user's head) moves in parallel in the real space, the position of the virtual viewpoint 51 with respect to the virtual space 50 does not change. That is, the virtual viewpoint 51 of the user is fixed at the center of the virtual space 50. In other words, in a case where the user moves in parallel in the real space, the virtual space 50 also moves in parallel with the user as much as the user moves. As a result, the virtual viewpoint 51 of the user is always maintained at the center of the virtual space 50.

On the other hand, in a case where the user performs an action of rotating or tilting his or her head (that is, the HMD 20 worn on his or her head) in a vertical direction or a horizontal direction, the user's virtual visual field direction from the virtual viewpoint 51 (direction D1 in FIG. 4) changes in accordance with the action. More specifically, the user's virtual visual field direction in the virtual space 50 is linked to the front direction of the HMD 20 in the real space. For example, in the real space, in a case where the user faces straight up and the front direction of the HMD 20 is a vertically upward direction, the user's virtual visual field direction in the virtual space 50 is a direction from the virtual viewpoint 51 toward the zenith portion P1. That is, the display unit 21 of the HMD 20 displays the scenery of the virtual space 50 (that is, the content 60 disposed in the virtual space 50) which is visible to the user when facing the zenith portion P1 from the virtual viewpoint 51. Similarly, in the real space, in a case where the user faces straight down and the front direction of the HMD 20 is a vertically downward direction, the user's virtual visual field direction in the virtual space 50 is a direction from the virtual viewpoint 51 toward the nadir portion P2. That is, the display unit 21 of the HMD 20 displays the scenery of the virtual space 50 (that is, the content 60 disposed in the virtual space 50) which is visible to the user when facing the nadir portion P2 from the virtual viewpoint 51.

Figure 4:
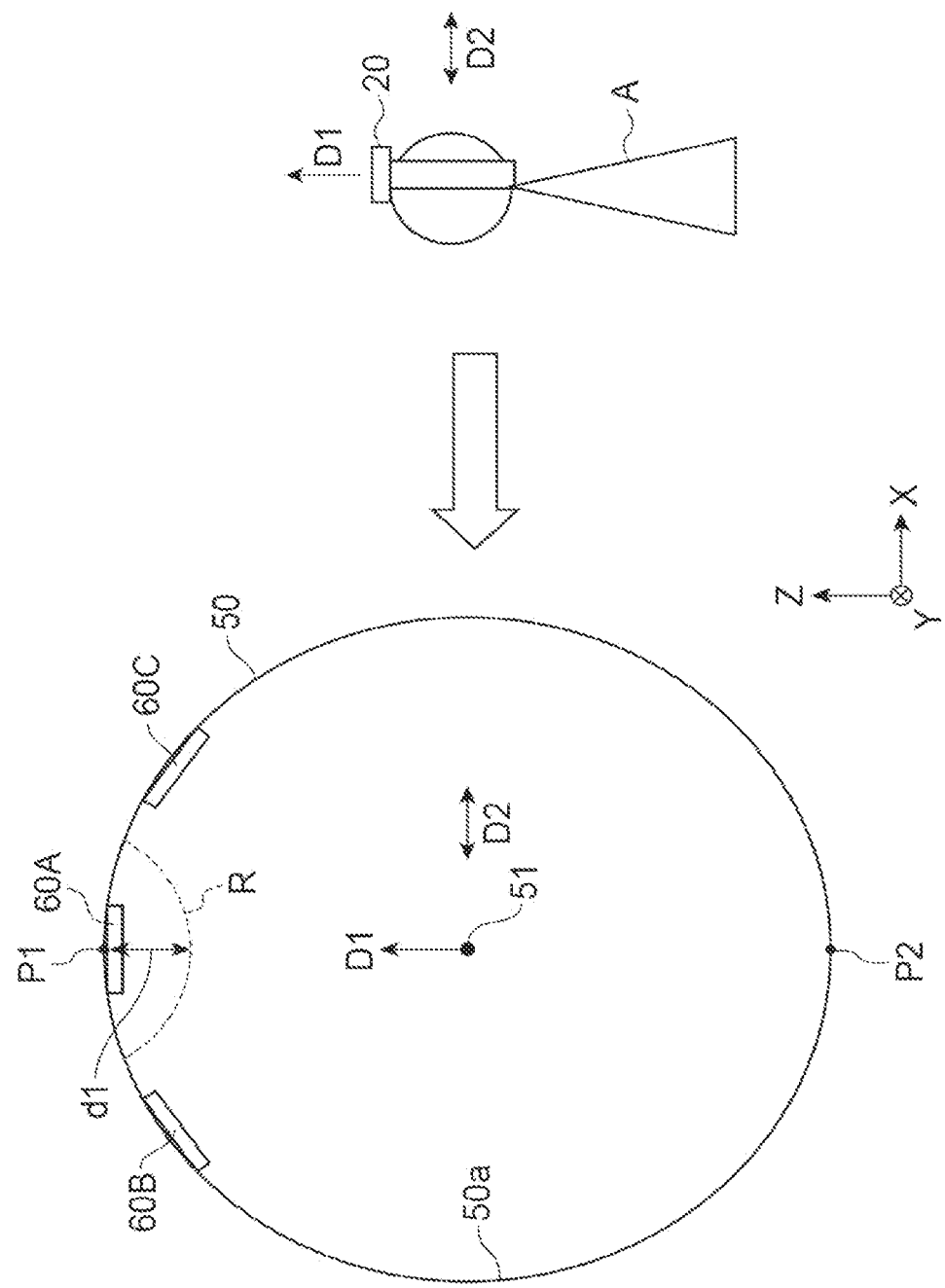
FIG. 4 is a diagram illustrating an example of a target region which is set in a case where a user is not in a sleeping posture.

The example shown in FIG. 4 shows a state in which a user A is standing facing the negative direction in the X-axis direction (left direction in the drawing) and is temporarily facing straight up. In this case, the front direction of the HMD 20 (that is, the user's virtual visual field direction in the virtual space 50) is a vertically upward direction. In addition, the vertical direction of the HMD 20 (direction D2 in FIG. 4) is parallel to the X-axis direction. The vertical direction of the HMD 20 is the vertical direction of the screen displayed on the display unit 21, and corresponds to the vertical direction of the user's visual field (that is, the vertical direction when viewed by the user).

The detection unit 12 detects the orientation of the HMD 20. For example, the detection unit 12 detects the orientation of the HMD 20 by acquiring posture information of the HMD 20 detected by the position posture sensor 22 of the HMD 20. Through such processing, the detection unit 12 can detect the front direction (direction D1) and the vertical direction (direction D2) of the HMD 20.

In addition, the detection unit 12 detects the height position of the HMD 20 in the vertical direction. For example, the detection unit 12 detects the height position of the HMD 20 by acquiring position information of the HMD 20 detected by the position posture sensor 22 of the HMD 20. Here, the position information indicating the height position may be, for example, information indicating the position in the height direction measured by GPS or the like, or may be, for example, information indicating the difference in height from a reference value in a case where the height position of the HMD 20 at the startup is set as the reference value.

The posture determination unit 13 determines the user's posture on the basis of the state of the HMD 20 detected by the detection unit 12. In the present embodiment, as an example, the posture determination unit 13 determines whether the user's posture is a sleeping posture with the user's face facing vertically upward (in one direction in the vertical direction). First to third examples of posture determination performed by the posture determination unit 13 will be described below.

(First Example of Posture Determination)

The posture determination unit 13 determines that the user's posture is a sleeping posture in a case where a state in which the front direction of the HMD 20 detected by the detection unit 12 is facing vertically upward (positive direction in the Z-axis direction) continues for a predetermined threshold time or more. The above threshold time may be fixedly set by a service provider, or may be arbitrarily set by the user.

For example, in a case where the user is in a standing posture or a sitting posture, it is unlikely that the user will look straight up. In addition, even though the user looks straight up, it is unlikely that the user will maintain the same posture for a long period of time. On the other hand, in a case where the user is in a sleeping posture, it is considered that a state in which the user is facing vertically upward continues for a certain length of time. According to the first example, the user's sleeping posture can be determined with a good degree of accuracy on the basis of the above idea.

(Second Example of Posture Determination)

The posture determination unit 13 determines that the user's posture is a sleeping posture in a case where the front direction of the HMD 20 detected by the detection unit 12 at present is facing vertically upward, and the difference between the height position h1 (first height position) of the HMD 20 detected by the detection unit 12 at present and the height position h2 (second height position) of the HMD 20 detected by the detection unit 12 at the startup of the HMD 20 ("h1−h2" or "h2−h1") is equal to or greater than a threshold determined in advance. The above threshold may be fixedly set by a service provider, or may be arbitrarily set by the user.

For example, in a case where the user maintains the previous posture (for example, a standing posture or a sitting posture) and looks straight up (that is, in a case where the front direction of the HMD 20 faces vertically upward), the height position of the HMD 20 is expected to remain approximately the same as the height position at the startup. On the other hand, for example, in a case where the user moves to the floor, bed, or the like and sleeps on it, the height position of the HMD 20 at present is considered to change significantly from the height position of the HMD 20 at the startup. According to the second example, the user's sleeping posture can be determined with a good degree of accuracy on the basis of the above idea.

(Third Example of Posture Determination)

The posture determination unit 13 determines that the user's posture is a sleeping posture in a case where the vertical direction of the HMD 20 detected by the detection unit 12 is along the horizontal direction at the startup of the HMD 20.

For example, in a case where the user is already in a sleeping posture at a point of time when the user wears the HMD 20 and starts up the HMD 20, the vertical direction of the HMD 20 is along the horizontal direction at the startup of the HMD 20. According to the third example, even in a case where the user is already in a sleeping posture at the startup as described above, the user's sleeping posture can be determined with a good degree of accuracy.

The region control unit 14 controls the range of a target region in accordance with the user's posture determined by the posture determination unit 13. The target region is a region in the virtual space 50 which is a target of display control (control of the display direction of the content 60) performed by the display control unit 15. In the present embodiment, since the content 60 is disposed along the spherical surface 50a of the virtual space 50, the target region is set as a region along the spherical surface 50a. As an example, the target region is set vertically above the virtual viewpoint 51 (on one side in the vertical direction). In the present embodiment, the target region is set as a region including the zenith portion P1.

In the present embodiment, the region control unit 14 makes the range of a target region R in a case where the posture determination unit 13 determines that the user's posture is a sleeping posture larger than the range of the target region R in a case where the posture determination unit 13 does not determine that the user's posture is the sleeping posture. A specific example of control performed by the region control unit 14 will be described with reference to FIGS. 4 and 5.

Figure 5:
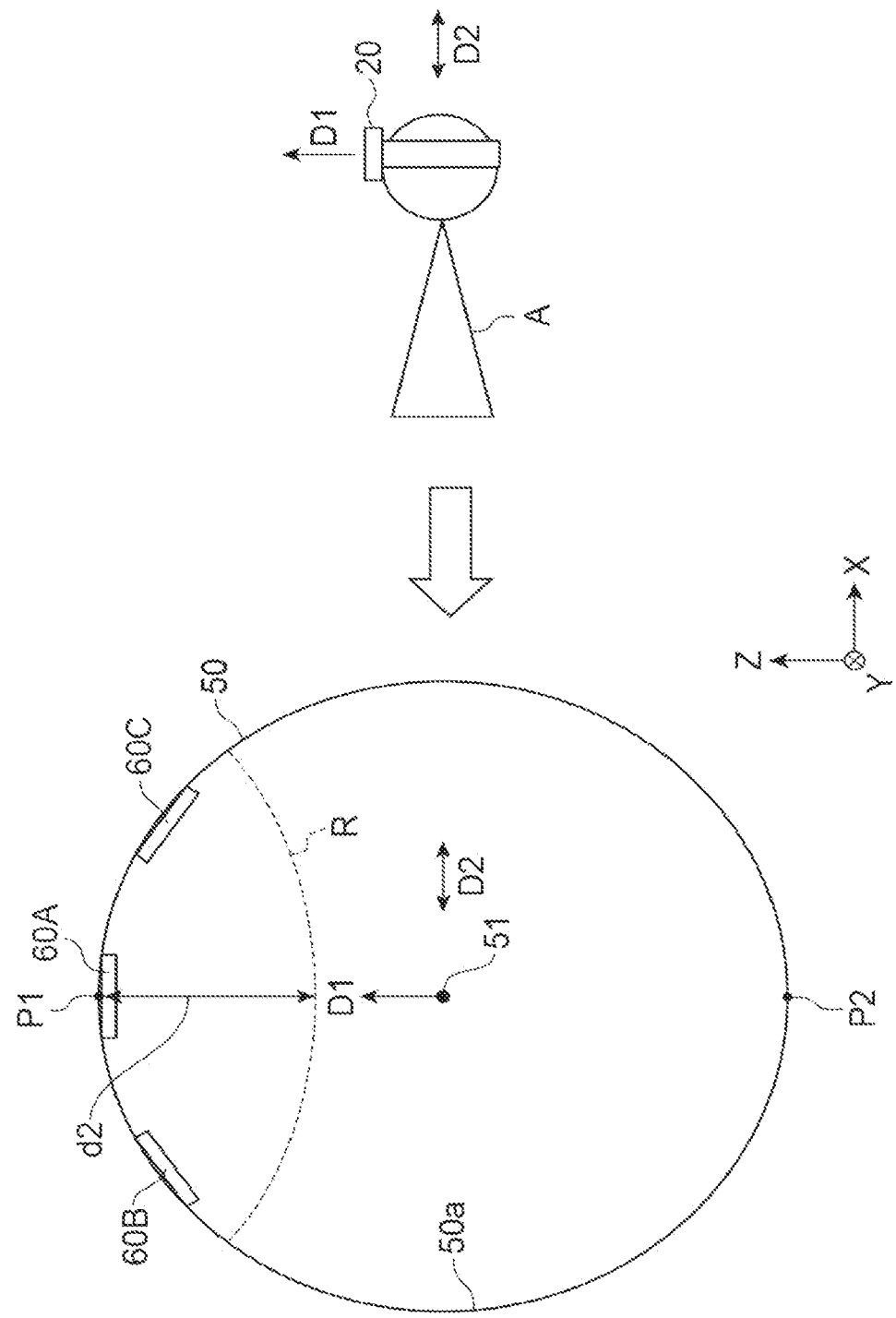
FIG. 5 is a diagram illustrating an example of a target region which is set in a case where a user is in a sleeping posture.

FIG. 4 is a diagram illustrating an example of a target region R which is set for a user A who is not in a sleeping posture. On the other hand, FIG. 5 is a diagram illustrating an example of the target region R which is set for the user A who is in a sleeping posture. In the examples shown in FIGS. 4 and 5, three pieces of content 60A, 60B, and 60C are disposed along the spherical surface 50a above the virtual viewpoint 51 in the virtual space 50. The content 60A is disposed at a position overlapping the zenith portion P1, and the content 60B and 60C are disposed so as to interpose the content 60A in the X-axis direction. The content 60B and 60C are disposed apart from the content 60A on both sides of the content 60A.

In the example of FIG. 4, the user A is temporarily facing vertically upward in a standing posture. In this case, the posture determination unit 13 determines that the user A is not in a sleeping posture. The region control unit 14 then sets the range of the target region R to a size corresponding to a case where the user's posture is not determined to be a sleeping posture. As an example, the region control unit 14 sets a region along the spherical surface 50a whose distance from the zenith portion P1 is within a predetermined threshold d1 as the target region R. The above threshold d1 may be fixedly set by a service provider, or may be arbitrarily set by the user.

In the example of FIG. 5, the user A is in a sleeping posture with the top of the head facing the positive direction in the X-axis direction, and is facing vertically upward for a certain period of time or more. In this case, the posture determination unit 13 determines that the user A is in a sleeping posture. The region control unit 14 then sets the range of the target region R to a size corresponding to a case where the user's posture is determined to be a sleeping posture. As an example, the region control unit 14 sets a region along the spherical surface 50a whose distance from the zenith portion P1 is within a predetermined threshold d2 as the target region R. Here, the threshold d2 is set to a value larger than the threshold d1. The above threshold d2 may be fixedly set by a service provider, or may be arbitrarily set by the user.

The display control unit 15 controls the display direction of the content 60 disposed in the target region R in the virtual space 50 to make the vertical direction of the content 60 and the vertical direction of the HMD 20 coincide with each other. Meanwhile, information indicating the vertical direction of the content 60 may be associated with the content 60 in advance, for example, as meta information of the content 60. In this case, the display control unit 15 can specify the vertical direction of the content 60 by referring to the information.

Figure 6:
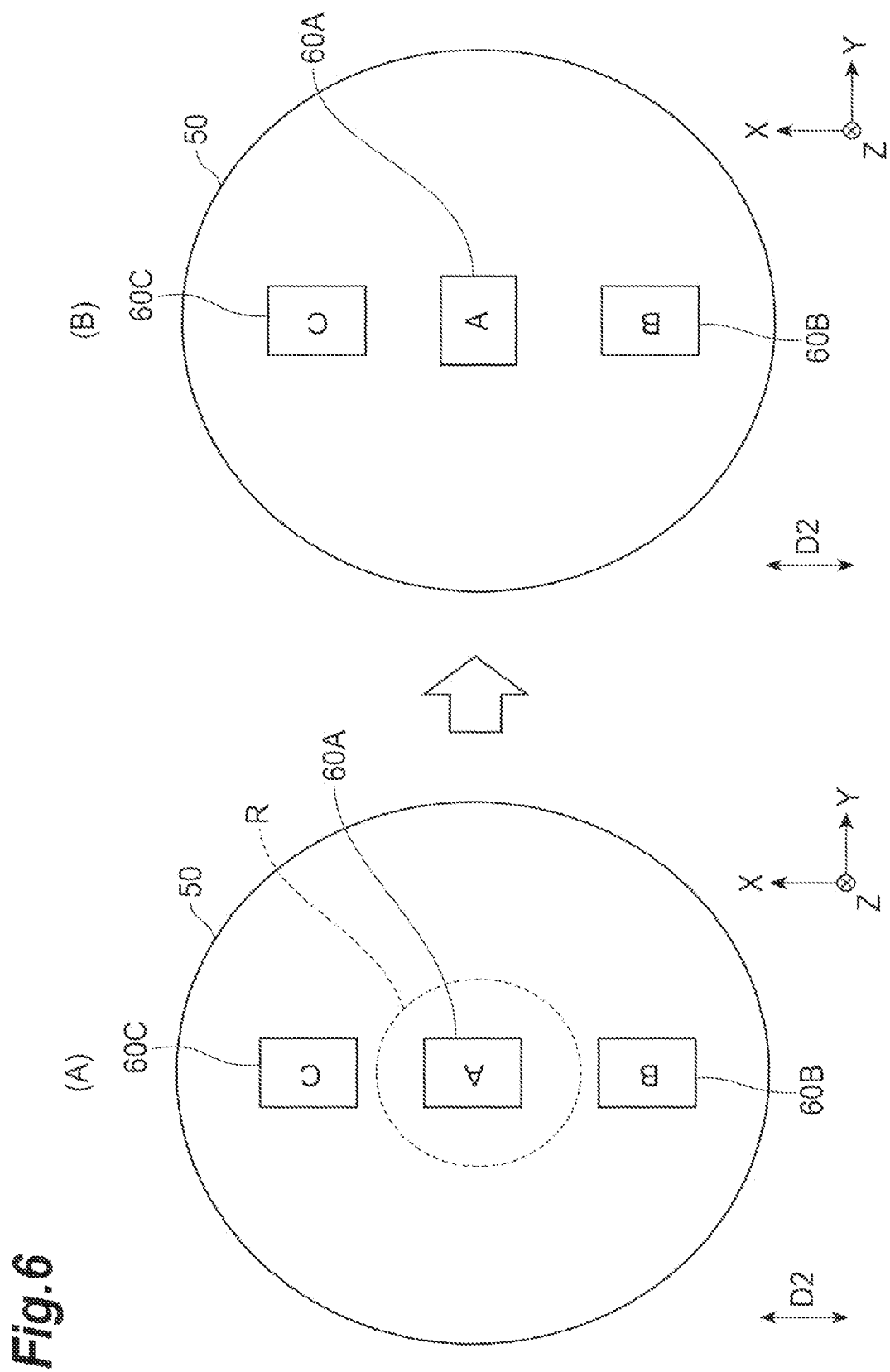
FIG. 6 is a diagram illustrating an example of content display control corresponding to the state of FIG. 4.

An example of display control performed by the display control unit 15 in a case where the user is not in a sleeping posture (as an example, a case where the user is in a standing posture) will be described with reference to FIGS. 4 and 6. FIG. 6 shows the virtual space 50 which is displayed on the display unit 21 of the HMD 20 of the user A in the state shown in FIG. 4. Part (A) of FIG. 6 shows a state before the display control performed by the display control unit 15 is executed, and part (B) of FIG. 6 shows a state after the display control performed by the display control unit 15 is executed. In FIG. 6, the letters "A," "B," and "C" displayed in the content 60A, 60B, and 60C do not represent the actual display details of the content 60A, 60B, and 60C, but represent the display direction (vertical direction) of the content 60A, 60B, and 60C. More specifically, the vertical direction of the letters "A," "B," and "C" corresponds to the vertical direction of each piece of content 60A, 60B, and 60C. That is, in the state shown in part (A) of FIG. 6, the vertical direction of each piece of content 60A, 60B, and 60C coincides with the Y-axis direction. More specifically, each piece of content 60A, 60B, and 60C is disposed in the virtual space 50 with the negative direction in the Y-axis direction as an upward direction and the positive direction in the Y-axis direction as a downward direction. On the other hand, the direction D2 which is a vertical direction when viewed by the user A (that is, the vertical direction of the HMD 20) is along the X-axis direction. Therefore, the vertical direction of the HMD 20 and the vertical direction of each piece of content 60A, 60B, and 60C are orthogonal to each other. That is, when viewed by the user A, each piece of content 60A, 60B, and 60C appears to be disposed in a lateral direction.

As shown in part (A) of FIG. 6, in the state shown in FIG. 4, the content 60A among the content 60A, 60B, and 60C is disposed in the target region R. In this case, as shown in part (B) of FIG. 6, the display control unit 15 controls the display direction of the content 60A disposed in the target region R in the virtual space 50 to make the vertical direction of the content 60A and the vertical direction of the HMD 20 (that is, the direction D2) coincide with each other. As an example, the display control unit 15 changes the orientation (vertical direction) of the content 60A by rotating (spinning) the content 60A around the Z axis. The virtual space image to which the display control performed by the display control unit 15 has been applied is transmitted from the server 10 to the HMD 20. As a result, the user A can visually recognize the content 60A disposed in a natural orientation for the user A (that is, an orientation in which the vertical direction for the user A and the vertical direction of the content coincide with each other).

Figure 7:
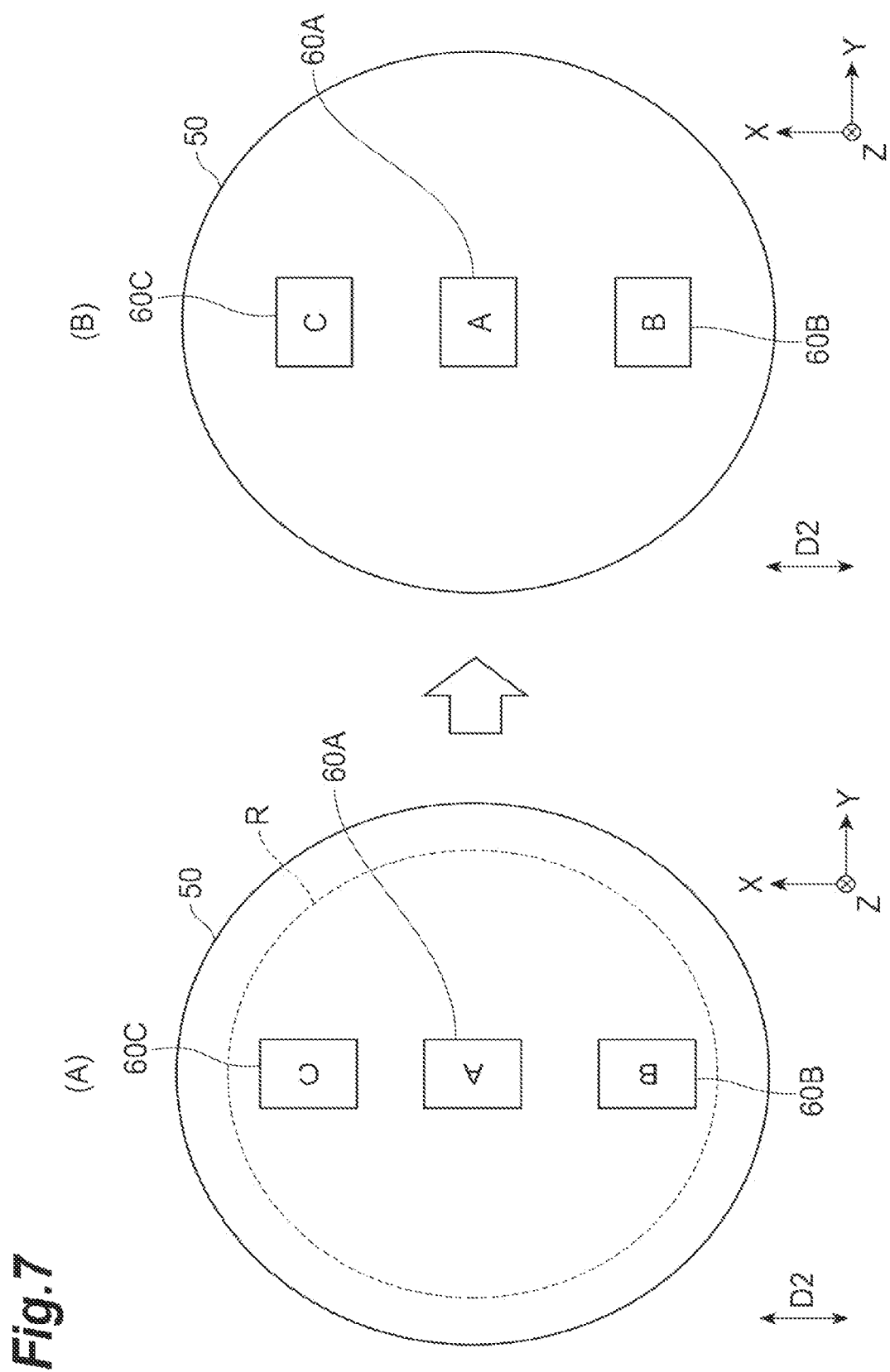
FIG. 7 is a diagram illustrating an example of content display control corresponding to the state of FIG. 5.

Next, an example of display control performed by the display control unit 15 in a case where the user is in a sleeping posture will be described with reference to FIGS. 5 and 7. FIG. 7 shows the virtual space 50 displayed on the display unit 21 of the HMD 20 of the user A in the state shown in FIG. 5. Part (A) of FIG. 7 shows a state before the display control performed by the display control unit 15 is executed, and part (B) of FIG. 7 shows a state after the display control performed by the display control unit 15 is executed.

As shown in part (A) of FIG. 7, in the state shown in FIG. 5, the range of the target region R is set to be larger than in the state shown in FIG. 4. Therefore, all of the content 60A, 60B, and 60C are disposed in the target region R. In this case, as shown in (B) of FIG. 7, the display control unit 15 controls the display direction of each piece of content 60A, 60B, and 60C disposed in the target region R in the virtual space 50 to make the vertical direction of the content 60A, 60B, and 60C and the vertical direction of the HMD 20 (that is, the direction D2) coincide with each other. The virtual space image to which the display control performed by the display control unit 15 has been applied is transmitted from the server 10 to the HMD 20. As a result, the user A can visually recognize the content 60A, 60B, and 60C disposed in a natural orientation for the user A.

Meanwhile, a specific method of determining whether content is disposed in the target region R is particularly not limited. For example, in a case where the entire content is included in a target region (overlapping the target region), the content may be determined to be disposed in the target region, and in a case where at least a portion of the content is included in the target region, the content may be determined to be disposed in the target region. In the present embodiment, it is determined whether the content is disposed in the target region R using the latter method.

Meanwhile, the virtual space 50 generated by the virtual space generation unit 11 may be shared by a plurality of users (that is, a plurality of HMDs 20 connected to the server 10). In this case, for example, when one user edits the content 60 (such as, for example, changes display information displayed on the display surface 60a of the content 60, adds new content 60, changes the position of the content 60, or deletes the content 60) in the virtual space 50, the details of the editing are shared by the plurality of users. That is, the details of the content 60 edited by one user in the virtual space 50 are also reflected in the virtual space displayed on the display unit 21 of the HMD 20 of another user. Here, the virtual viewpoint 51 of each of the plurality of users is disposed at the center of the virtual space 50, but the visual field direction (direction D1) from the virtual viewpoint 51 of each user changes in accordance with the orientation of the HMD 20 worn on each user's head. That is, a common virtual space 50 is provided to the plurality of users, but the details (the range of the virtual space 50) displayed on the display unit 21 of the HMD 20 of each user differ depending on the direction each user is facing. In addition, the server 10 individually performs communication with each of the plurality of HMDs 20, and independently executes the processes of the detection unit 12, the posture determination unit 13, the region control unit 14, and the display control unit 15, among the functions of the server 10 described above, for each user (that is, for each HMD 20). As a result, for the user who faces straight up for a short period of time in a standing posture as shown in FIG. 4, a virtual space image indicating the virtual space 50 in which the display direction of only the content 60A is controlled as shown in part (B) of FIG. 6 is presented. On the other hand, for the user who is in a sleeping posture and facing straight up for a long period of time as shown in FIG. 5, a virtual space image indicating the virtual space 50 in which all the display directions of the content 60A, 60B, and 60C are controlled as shown in part (B) of FIG. 7 is presented.

According to the above configuration, in a case where a common virtual space 50 is shared by a plurality of users, the display direction of the content 60 is individually controlled for each user, and thus it is possible to provide each user with a virtual space in which the display direction of the content is appropriately controlled in accordance with each user's posture.

Figure 8:
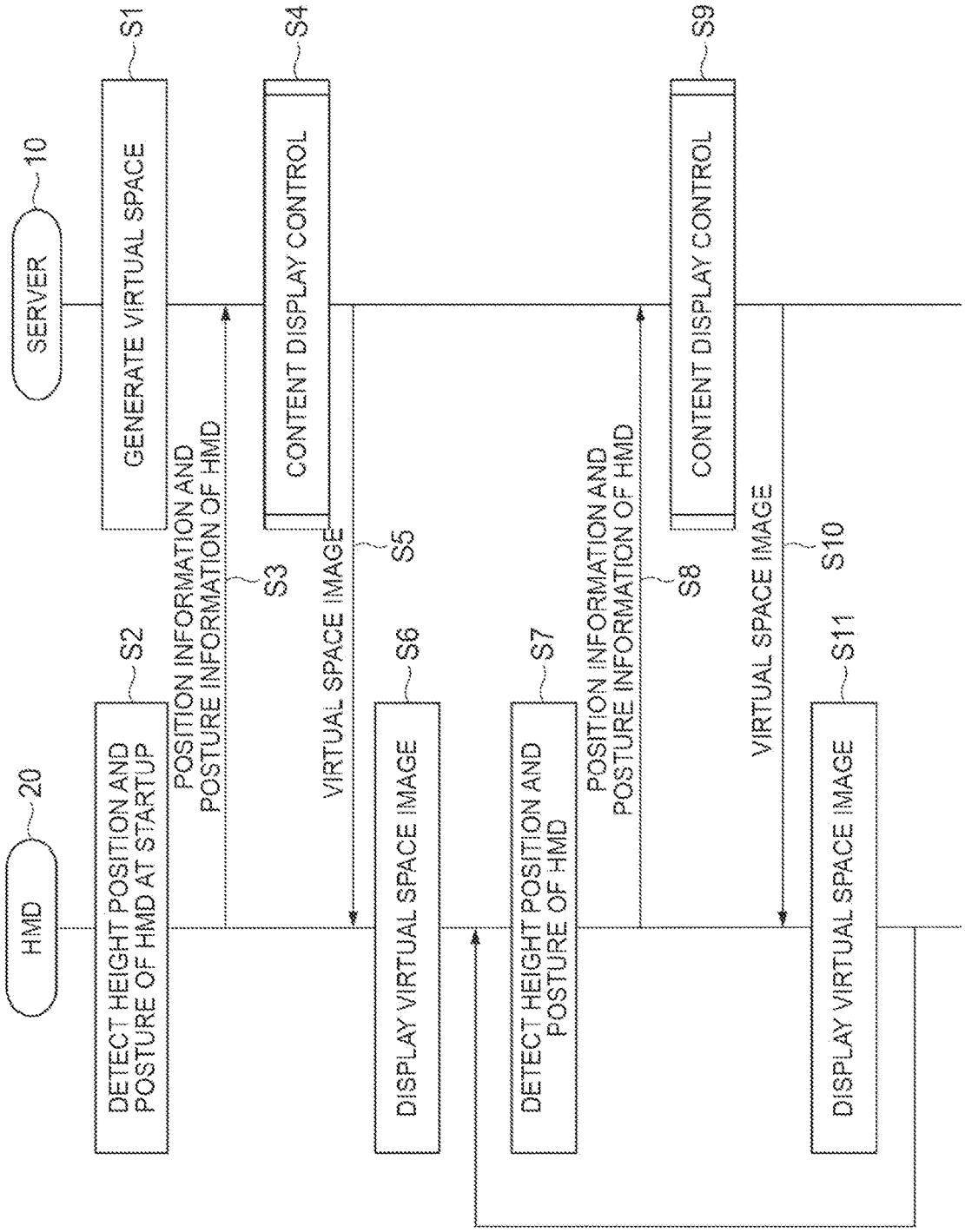
FIG. 8 is a sequence diagram illustrating an example of the operation of the virtual space presentation system.

Next, an example of the operation of the virtual space presentation system 1 (including a method of providing a virtual space according to the embodiment) will be described with reference to FIG. 8. Here, description will be given with a focus on processing executed between the HMD 20 of a certain user and the server 10.

In step S1, the virtual space generation unit 11 generates the virtual space 50.

In step S2, when the HMD 20 is started up by turning on the power button or the like in a state where the HMD 20 is worn on the user's head, the position posture sensor 22 detects the height position and posture (the directions D1 and D2 in FIGS. 4 and 5) of the HMD 20 at the startup.

In step S3, the position information indicating the height position of the HMD 20 at the startup and the posture information indicating its posture detected by the position posture sensor 22 are transmitted from the HMD 20 to the server 10. As a result, the height position and posture of the HMD 20 at the startup are detected by the detection unit 12.

Figure 9:
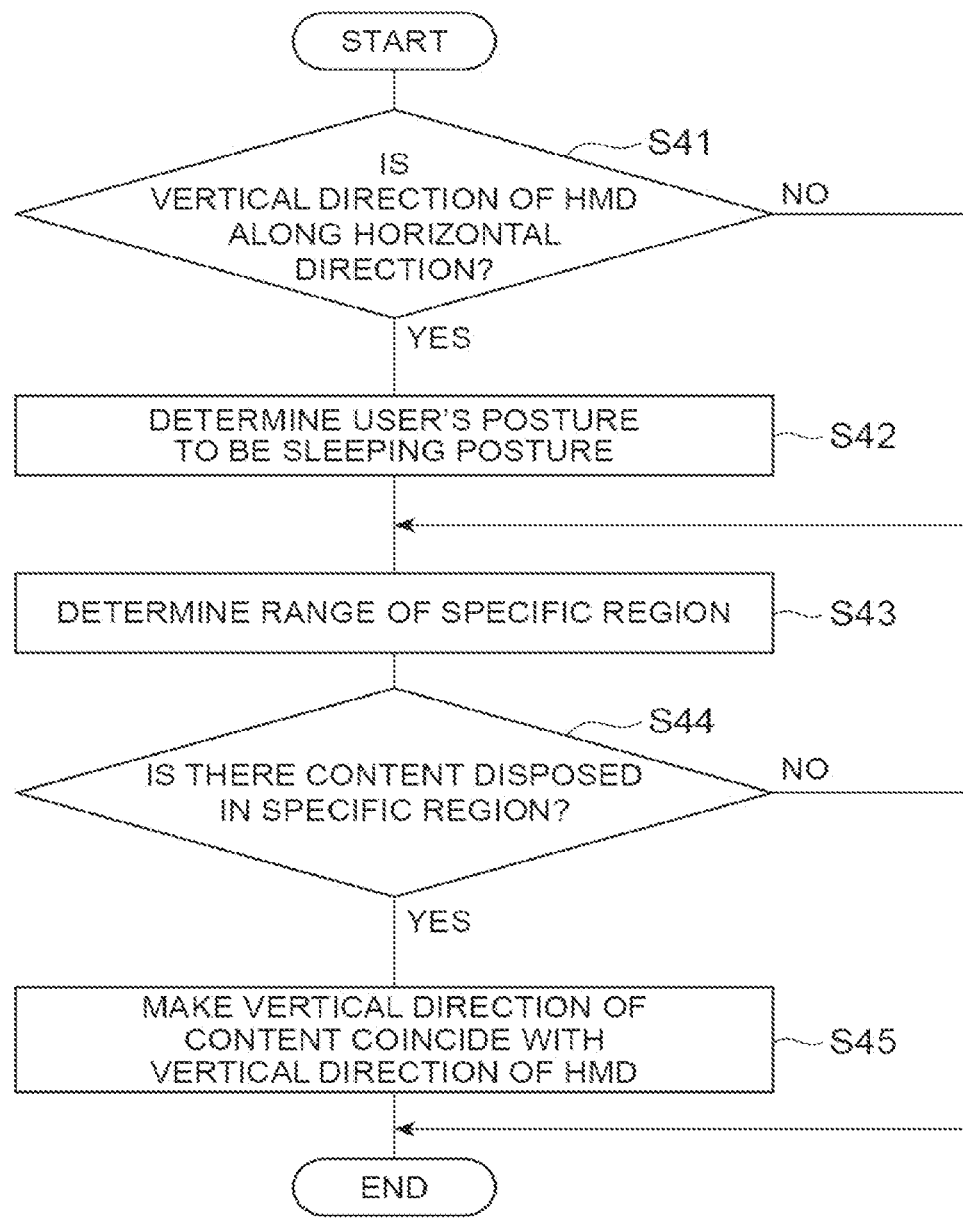
FIG. 9 is a flowchart illustrating an example of the process of step S4 in FIG. 8.

In step S4, content display control at the startup of the HMD 20 is executed. In the present embodiment, display control based on the third example of posture determination described above is executed. FIG. 9 is a flowchart illustrating an example of the process of step S4.

In step S41, the posture determination unit 13 determines whether the vertical direction of the HMD 20 (the direction D2 in FIGS. 4 and 5) detected by the detection unit 12 at the startup of the HMD 20 is along the horizontal direction.

In a case where it is determined that the vertical direction of the HMD 20 at the startup is along the horizontal direction (step S41: YES), the posture determination unit 13 determines that the user's posture is a sleeping posture (step S42). On the other hand, in a case where it is not determined that the vertical direction of the HMD 20 at the startup is along the horizontal direction (step S41: NO), the posture determination unit 13 does not determine that the user's posture is the sleeping posture.

In step S43, the region control unit 14 determines the range of the target region in accordance with the user's posture determined by the posture determination unit 13. The region control unit 14 makes the range of the target region R in a case where the posture determination unit 13 determines that the user's posture is the sleeping posture larger than the range of the target region R in a case where the posture determination unit 13 does not determine that the user's posture is the sleeping posture. In the present embodiment, in a case where it is not determined that the user's posture is the sleeping posture, as shown in FIG. 4 and part (A) of FIG. 6, the region control unit 14 sets a relatively small target region R (as an example, a region whose distance along the spherical surface 50a from the zenith portion P1 is within the threshold d1). On the other hand, in a case where it is determined that the user's posture is the sleeping posture, as shown in FIG. 5 and part (A) of FIG. 7, the region control unit 14 sets a relatively large target region R (as an example, a region whose distance along the spherical surface 50a from the zenith portion P1 is within the threshold d2).

In step S44, the display control unit 15 determines whether there is the content 60 disposed within the target region R. In in a case where there is the content 60 disposed within the target region R (step S44: YES), the display control unit 15 controls the display direction of the content 60 to thereby make the vertical direction of the content 60 coincide with the vertical direction of the HMD 20 (step S45). That is, in a case where the content 60A is disposed within the target region R as shown in part (A) of FIG. 6, the display control unit 15 makes the vertical direction of the content 60A coincide with the vertical direction of the HMD 20 as shown in part (B) of FIG. 6. In addition, in a case where the content 60A, 60B, and 60C are disposed within the target region R as shown in part (A) of FIG. 7, the display control unit 15 makes the vertical direction of each piece of content 60A, 60B, and 60C coincide with the vertical direction of the HMD 20 as shown in part (B) of FIG. 7. On the other hand, in a case where there is no content 60 disposed within the target region R (step S44: NO), the display control performed by the display control unit 15 is not executed.

Referring back to FIG. 8, in step S5, a virtual space image indicating the virtual space 50 generated by the virtual space generation unit 11 (the virtual space 50 in a state after the process of step S4 is executed) is transmitted from the server 10 to the HMD 20. Specifically, a virtual space image corresponding to the visual field direction (the direction D1 in FIGS. 4 and 5) determined on the basis of the orientation of the HMD 20 is transmitted from the server 10 to the HMD 20.

In step S6, the display unit 21 displays the virtual space image received from the server 10. Meanwhile, a process of rendering a virtual space image to be displayed on the display unit 21 may be executed on the server 10 side, or may be executed on the HMD 20 side. In a case where the rendering process is executed on the HMD 20 side, in step S5, data necessary for the rendering process is transmitted from the server 10 to the HMD 20.

Next, the processes of steps S7 to S11 are continuously executed.

The process of step S7 is the same as the process of step S2. That is, in step S7, the position posture sensor 22 detects the height position and posture (the directions D1 and D2 in FIGS. 4 and 5) of the HMD 20.

The process of step S8 is the same as the process of step S3. That is, in step S8, the position information indicating the height position of the HMD 20 at the startup and the posture information indicating its posture detected by the position posture sensor 22 are transmitted from the HMD 20 to the server 10.

Figure 10:
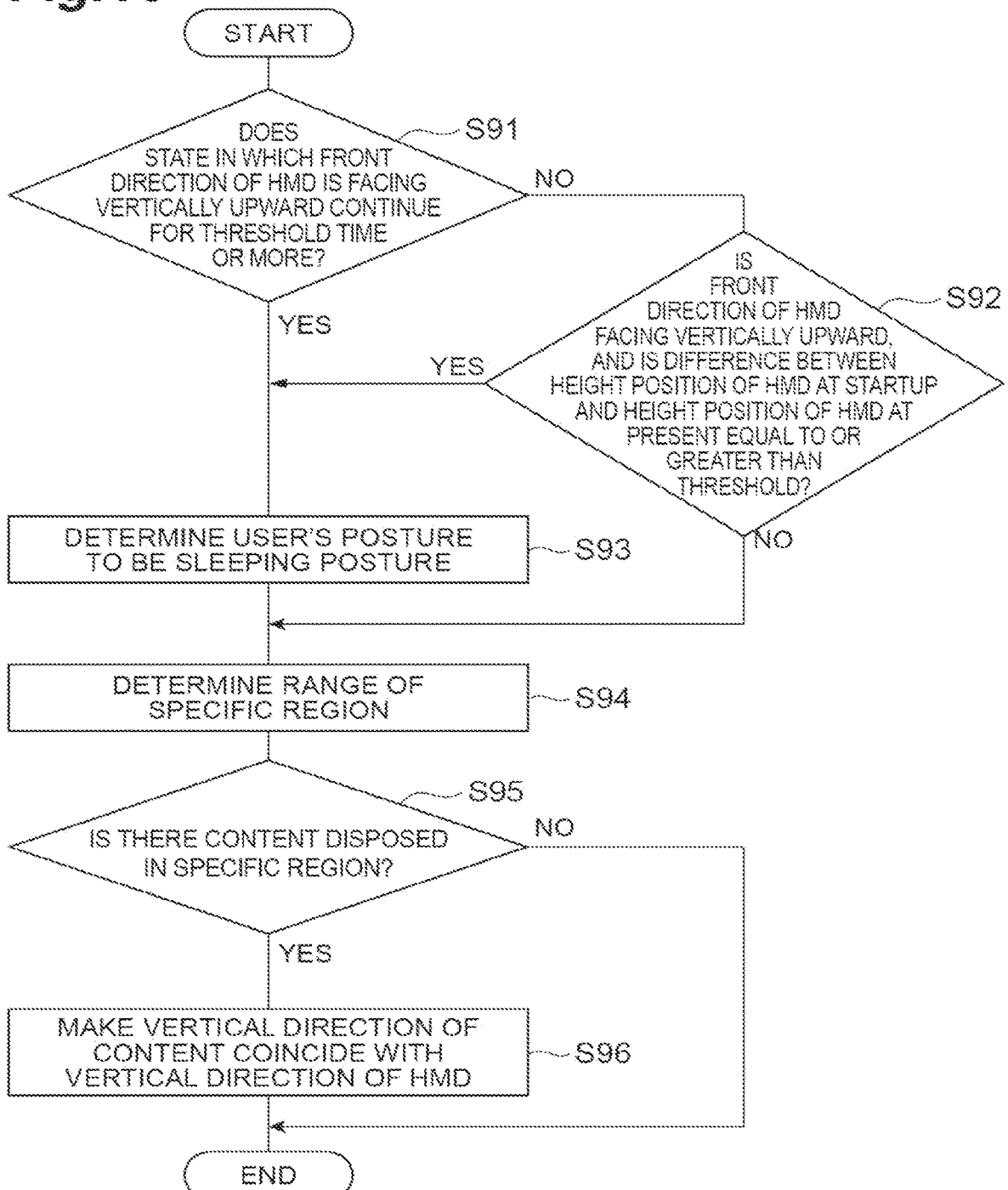
FIG. 10 is a flowchart illustrating an example of the process of step S9 in FIG. 8.

In step S9, the content display control to be continuously executed after the startup of the HMD 20 is executed. In the present embodiment, display control based on the first example and the second example of posture determination described above is executed. FIG. 10 is a flowchart illustrating an example of the process of step S9. Meanwhile, the processes of steps S93 to S96 in FIG. 10 are the same as the processes of steps S42 to S45 in FIG. 9, and thus detailed description thereof will be omitted.

In step S91, the posture determination unit 13 executes the first example of posture determination described above. That is, the posture determination unit 13 determines whether the state in which the front direction (the direction D1 in FIGS. 4 and 5) of the HMD 20 detected by the detection unit 12 is facing vertically upward continues for a predetermined threshold time or more. In a case where it is determined that the state in which the front direction of the HMD 20 is facing vertically upward continues for a threshold time or more (step S91: YES), the posture determination unit 13 determines that the user's posture is the sleeping posture (step S93), and executes the processes of steps S94 to S96.

On the other hand, in a case where it is not determined that the state in which the front direction of the HMD 20 is facing vertically upward continues for a threshold time or more (step S91: NO), the posture determination unit 13 executes the process of the second example of posture determination described above. That is, the posture determination unit 13 determines whether the front direction of the HMD 20 detected by the detection unit 12 at present is facing vertically upward, and the difference between the height position h1 (first height position) of the HMD 20 detected by the detection unit 12 at present and the height position h2 (second height position) of the HMD 20 detected by the detection unit 12 at the startup of the HMD 20 ("h1−h2" or "h2−h1") is equal to or greater than a threshold determined in advance. In a case where it is determined that the above difference is equal to or greater than the threshold (step S92: YES), the posture determination unit 13 determines that the user's posture is the sleeping posture (step S93), and executes the processes of steps S94 to S96. On the other hand, in a case where it is not determined that the above difference is equal to or greater than the threshold (step S92: NO), the posture determination unit 13 does not determine that the user's posture is the sleeping posture, and executes the processes of steps S94 to S96.

Meanwhile, in the example of FIG. 10, the determination process of step S91 (the first example of posture determination) is executed before the determination process of step 92 (the second example of posture determination), but the determination process of step S92 may be executed before the determination process of step S91.

Referring back to FIG. 8, in step S10, a virtual space image indicating the virtual space 50 generated by the virtual space generation unit 11 (the virtual space 50 in a state after the process of step S9 is executed) is transmitted from the server 10 to the HMD 20. Specifically, a virtual space image corresponding to the visual field direction (the direction D1 in FIGS. 4 and 5) determined on the basis of the orientation of the HMD 20 is transmitted from the server 10 to the HMD 20.

In step S11, the display unit 21 displays the virtual space image received from the server 10.

In the server 10 described above, the display direction of only the content 60 disposed in the target region R among the content 60 disposed in the virtual space 50 is controlled so that the vertical direction of the content 60 and the vertical direction of the HMD 20 coincide with each other. In this way, by limiting the range (the target region R) of the content 60 whose display direction is to be controlled, it is possible to achieve a reduction in the amount of calculation required for display control. In addition, by controlling the range of the target region R in accordance with the user's posture determined on the basis of the state of the HMD 20, it is possible to appropriately set the range of the content 60 which is a target for display control in accordance with the user's posture, and to maintain user convenience.

In addition, the virtual viewpoint 51 may be disposed at the center of the virtual space 50, the visual field direction from the virtual viewpoint 51 of the user (the direction D1 in FIGS. 4 and 5) may change in accordance with the orientation of the HMD 20, the target region R may be set at least on one side in the vertical direction of the virtual viewpoint 51 (in the present embodiment, vertically upward), and the region control unit 14 may make the range of the target region R in a case where the posture determination unit 13 determines that the user's posture is a sleeping posture with the user's face facing one side in the vertical direction larger than the range of the target region R in a case where the posture determination unit 13 does not determine that the user's posture is the sleeping posture. For example, in a case where the user is in a posture other than the sleeping posture (such as, for example, a standing posture or a sitting posture) and only temporarily faces straight up, the user's viewing range is limited. For example, since it is unlikely that the user will take a posture in which he or she bends backward significantly (for example, a posture in the case of bridging), it is unlikely that the user will look behind him or her rather than directly above the user (directly above his/her head). On the other hand, in a case where the user is in a sleeping posture, the user's viewing range is wider than in a case where the user is in a posture other than the sleeping posture. That is, even though the user's visual field direction is the same, the range that the user mainly views within the display region of the display unit 21 may differ depending on the user's posture. Specifically, in a case where the user is in a sleeping posture, the range that the user views within the display region of the display unit 21 is wider than in a case where the user is in a posture other than the sleeping posture. Therefore, according to the above configuration, by widening the target region and expanding the range of the content 60 whose display direction is to be controlled in a case where the user is in a sleeping posture (in the present embodiment, a sleeping posture in a supine state), it is possible to effectively improve user convenience.

Meanwhile, in the above embodiment, a case where "one side in the vertical direction" is vertically upward has been described. That is, a case where the target region R is set vertically upward from the virtual viewpoint 51 (a portion including the zenith portion P1) has been described. Here, "one side in the vertical direction" may be vertically downward, and the target region R may be set vertically downward from the virtual viewpoint 51 (for example, a portion including the nadir portion P2). In this case, the same effect as in the above embodiment can also be achieved. That is, by widening the target region and expanding the range of the content 60 whose display direction is to be controlled in a case where the user is in a sleeping posture (in this case, the user is in a prone sleeping posture facing vertically downward), it is possible to effectively improve user convenience.

In addition, the display control unit 15 may perform display control on the content 60 as described below.
(First Modification Example of Display Control)

A function of changing the display direction of the content 60 may be configured to be capable of being set to be disabled for each piece of content 60. In this case, the display control unit 15 may be configured not to control the display direction of content 60 for which the above function is set to be disabled among the content 60 disposed in the target region R.

Figure 11:
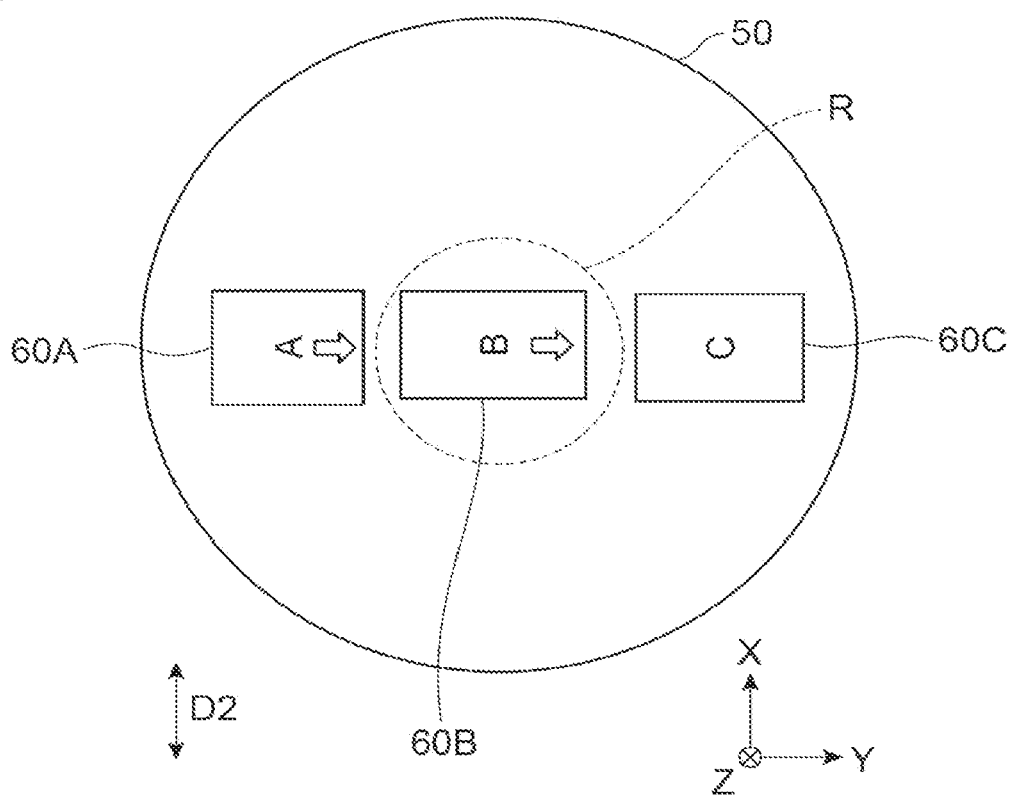
FIG. 11 is a diagram illustrating a first modification example of display control.

For example, as shown in FIG. 11, the three pieces of content 60A, 60B, and 60C are related to each other, and when the disposition and orientation of the three pieces of content 60A, 60B, and 60C are changed, the relationship between the content 60A, 60B, and 60C may collapse. In the example of FIG. 11, an arrow indicating the location of the content 60B is displayed within the content 60A so that the content 60B is referred to next to the content 60A. In addition, an arrow indicating the location of the content 60C is displayed within the content 60B so that the content 60C is referred to next to the content 60B. Here, the content 60B is disposed in the target region R. In this case, according to the display control of the display control unit 15 described in the above embodiment, the content 60B is rotated so that the vertical direction of the content 60B coincides with the vertical direction of the HMD 20 (the direction D2). As a result, the content 60C no longer exists at the end of the arrow displayed within the content 60B, and thus the relationship between the content 60B and the content 60C collapses.

In addition, if not only the content 60B but also the content 60A is included in the target region R, the content 60A will also be rotated together with the content 60B, so the content 60B will no longer exist at the end of the arrow displayed within the content 60A, and thus the relationship between the content 60A and the content 60B also collapses.

Consequently, in such a case, a function of changing the display direction of the content 60A, 60B, and 60C may be set to be disabled. By disabling the above functions of the content 60A, 60B, and 60C, the content 60A, 60B, and 60C can be excluded from targets for control even though the content 60A, 60B, and 60C are disposed in the target region R. As a result, the control of the display direction of the content (rotation of content) as described above can prevent the relationship between the content from collapsing.

In addition, as another example, there may also be the content 60 that has no concept of up, down, left or right, such as in a case where the display information displayed on the display surface 60a of the content 60 is rotationally symmetrical about the direction in which the content 60 is viewed from the virtual viewpoint 51. For such content 60, there is no point in controlling the display direction according to the vertical direction of the HMD 20. Consequently, for such content 60, the function of changing the display direction may also be set to be disabled. As a result, it is possible to omit unnecessary display control, and to achieve a further reduction in the amount of calculation.

Meanwhile, whether to disable the above function of the content 60 may be set arbitrarily by, for example, the user. Alternatively, as shown in the example shown in FIG. 11, in a case where a relationship exists between a plurality of pieces of content 60A, 60B, and 60C, the display control unit 15 may automatically disable the above functions of the content 60A, 60B, and 60C by referring to information relating to the above relationship embedded in the content 60A, 60B, and 60C.
(Second Modification Example of Display Control)

Figure 12:
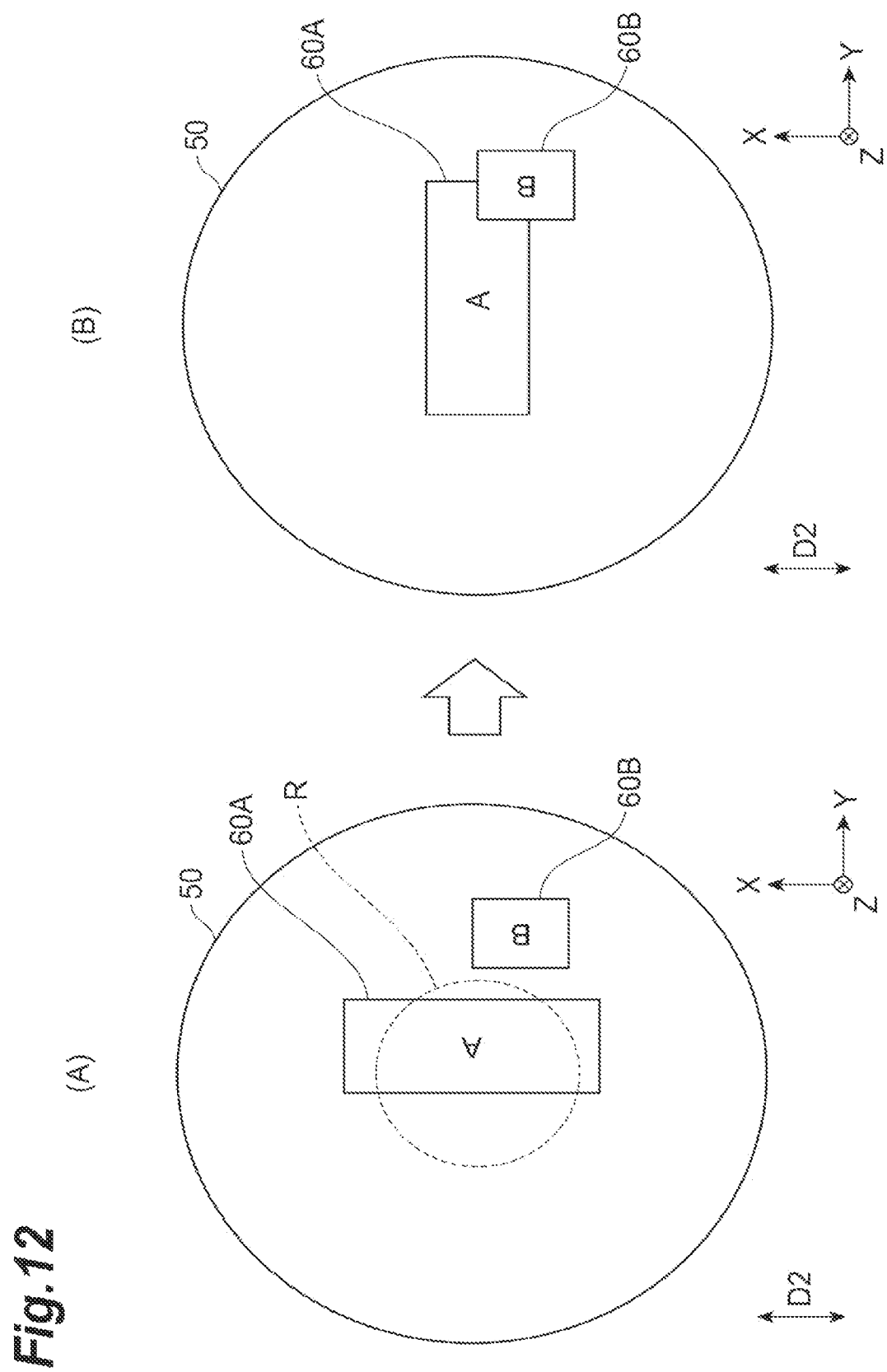
FIG. 12 is a diagram illustrating a second modification example of display control.

As shown in part (A) of FIG. 12, a case where the rectangular content 60A is disposed in the target region R is considered. In this case, when control of the display direction of the content 60A (that is, rotation of the content 60A) is executed so that the vertical direction of the content 60A coincides with the vertical direction of the HMD 20 (the direction D2), as shown in part (B) of FIG. 12, the content 60A may interfere with other content 60B. That is, a portion of one of the content 60A and 60B (in this example, the content 60A) may overlap and be hidden from the other of the content 60A and 60B (in this example, the content 60B). When such a situation occurs, the user cannot visually recognize the hidden portion as described above, and thus user convenience is impaired.

Figure 13:
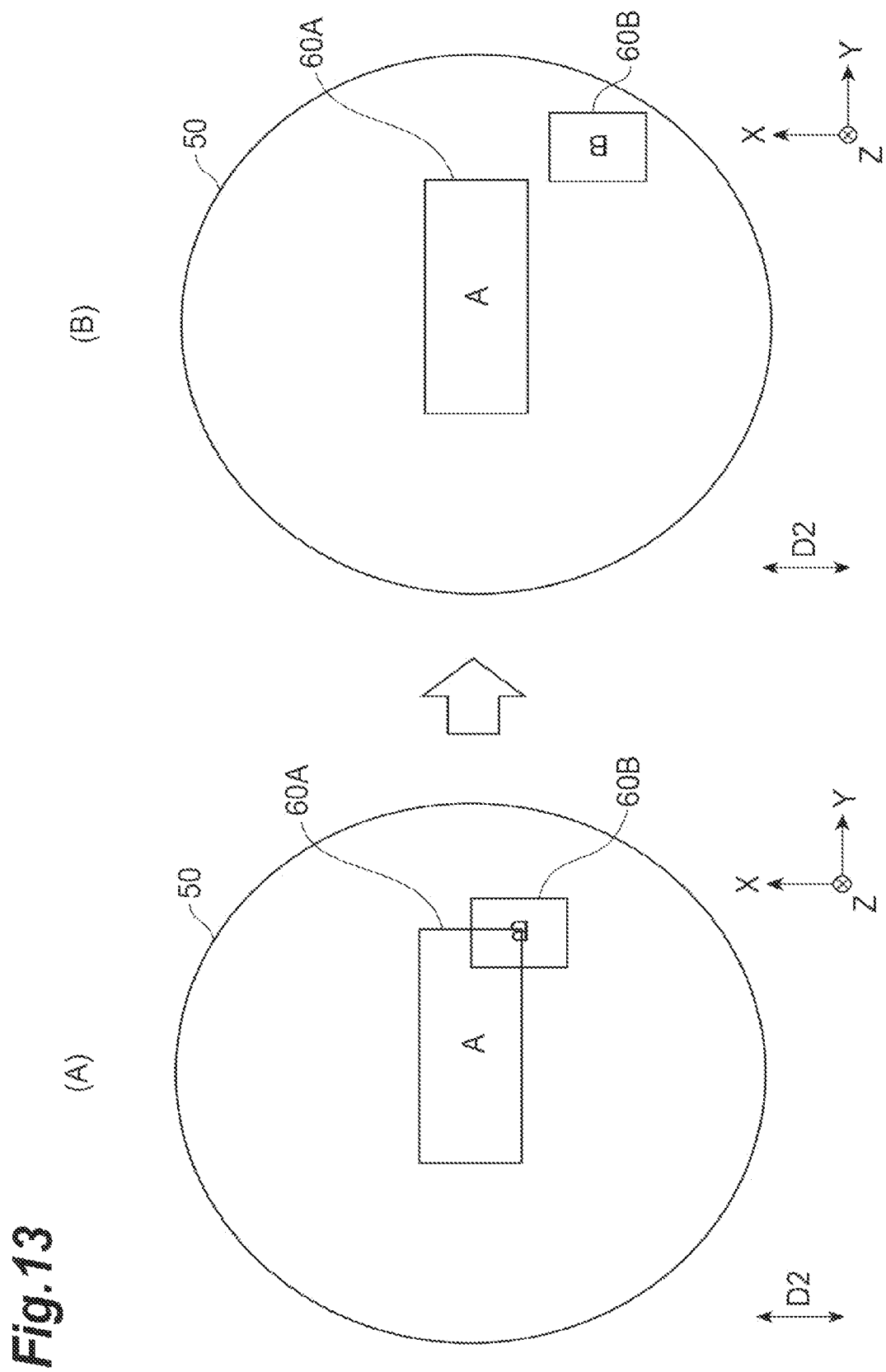
FIG. 13 is a diagram illustrating a second modification example of display control.

Consequently, in a case where first content disposed in the target region R (in the example of FIG. 12, the content 60A) overlaps second content other than the first content (in the example of FIG. 12, the content 60B) when the display direction of the first content is controlled, the display control unit 15 may transmissively display the first content or the second content. For example, as shown in part (A) of FIG. 13, the display control unit 15 may display a portion of the content 60B that overlaps the content 60A in a semi-transparent manner. As a result, it is possible to visually recognize a portion of the content 60A that overlaps the content 60B, and to improve user convenience.

Alternatively in a case where first content disposed in the target region R (in the example of FIG. 12, the content 60A) overlaps second content other than the first content (in the example of FIG. 12, the content 60B) when the display direction of the first content is controlled, the display control unit 15 may change disposition of at least one of first content and the second content so that the first content and second content do not overlap each other. For example, as shown in part (B) of FIG. 13, the display control unit 15 may eliminate the situation in which the content 60A and the content 60B overlap each other by slightly shifting the position of the content 60B toward the lower right when viewed by the user. As a result, the visibility of each piece of content 60A and 60B is improved, which leads to an improvement in user convenience.

(Other Modification Examples)

In the above embodiment, each piece of content 60 is disposed at a position located along the spherical surface 50a, but the position at which the content 60 is disposed in the virtual space 50 is not limited to the above. For example, the content may be disposed at a position away from the spherical surface 50a (a position closer to the virtual viewpoint 51 than the position at which the content 60 of the above embodiment is disposed). In addition, the position at which the target region R is set in the virtual space 50 may also be changed accordingly.

In addition, although the sphere-shaped virtual space 50 is illustrated in the above embodiment, a virtual space having a shape other than a sphere (such as, for example, a cube-shaped virtual space representing a virtual room space) may be generated by the virtual space generation unit 11.

In addition, although the content is configured as planar object with one side (the side facing the virtual viewpoint 51) as the display surface in the above embodiment, the shape of the content disposed in the virtual space 50 may be a shape other than the above (for example, a three-dimensional shape). The shape of a small-sized content may also be changed in accordance with the shape of the content.

In addition, although the server 10 functions as a virtual space presentation device in the above embodiment, the functions of the server 10 may be implemented in the HMD 20. In this case, the HMD 20 functions as a virtual space presentation device. In addition, some of the functions of the server 10 described above may be executed by the HMD 20. In this case, the server 10 and the HMD 20 function as a virtual space presentation device.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 14:
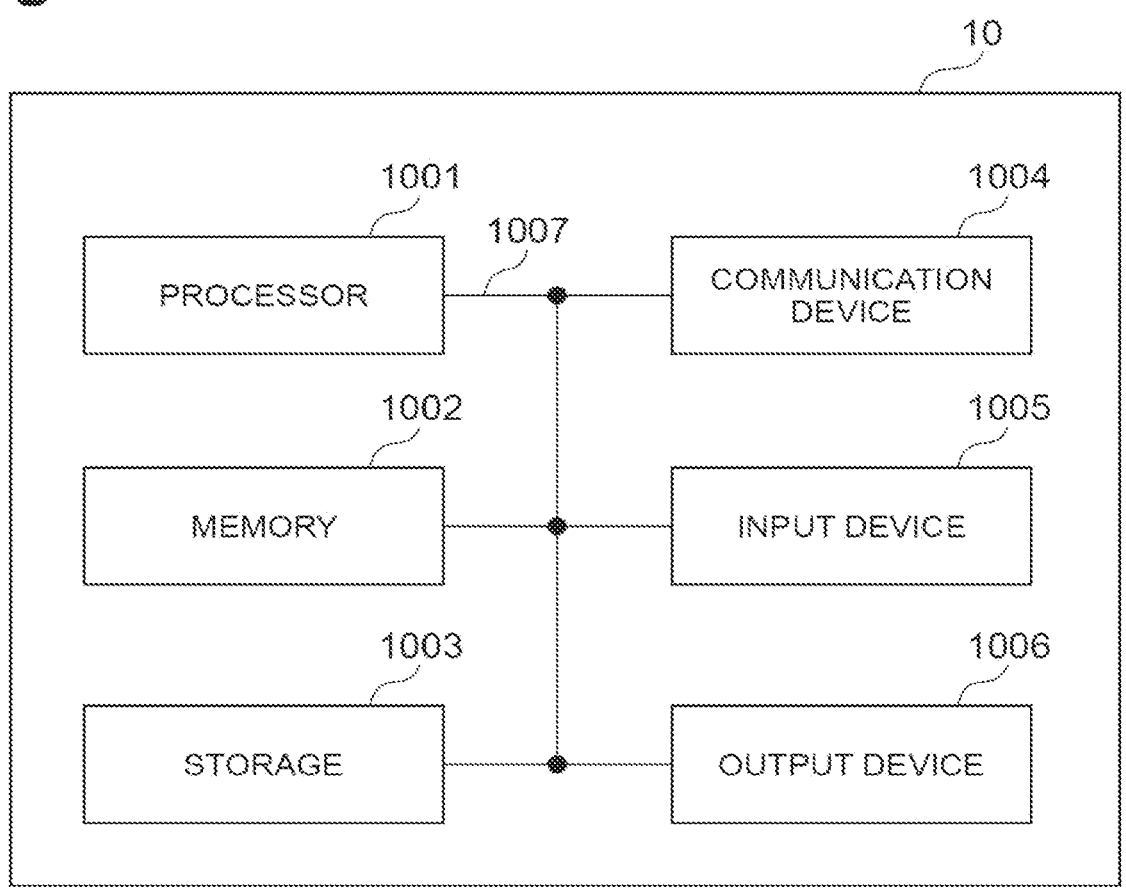
FIG. 14 is a diagram illustrating an example of a hardware configuration of a server.

For example, the server 10 according to an embodiment of the present invention may function as a computer that performs virtual space presentation method of the present disclosure. FIG. 14 is a diagram illustrating an example of a hardware configuration of the server 10 according to the embodiment of the present disclosure. The server 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the server 10 may include one or a plurality of devices illustrated in FIG. 14, or may be configured without including some of the devices. The HMD 20 may also have a hardware configuration similar to that of the server 10 shown in FIG. 14.

Each function in the server 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the display control unit 15) of the server 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the virtual space presentation method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the server 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution.

Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other".

The sentence may mean that "each of A and B is different from C". Terms such as "separate", "coupled", and the like may also be interpreted, similar to "different".

REFERENCE SIGNS LIST

1 Virtual space presentation system
10 Server (virtual space presentation device)
11 Virtual space generation unit
12 Detection unit
13 Posture determination unit
14 Region control unit
15 Display control unit
20 HMD
21 Display unit
22 Position posture sensor
50 Virtual space
51 Virtual viewpoint
60, 60A, 60B, 60C Content
R Target region

The invention claimed is:

1. A virtual space presentation device comprising:
a virtual space generation unit configured to generate a virtual space that includes a user's virtual viewpoint therein and in which virtual content is disposed;
a detection unit configured to detect an orientation of a head-mounted display worn on the user's head to display a portion of the virtual space which is visible from the virtual viewpoint;
a display control unit configured to control a display direction of the content disposed in a target region in the virtual space to make a vertical direction of the content and a vertical direction of the head-mounted display coincide with each other;
a posture determination unit configured to determine the user's posture on the basis of a state of the head-mounted display; and
a region control unit configured to determine a range of the target region in accordance with the user's posture determined by the posture determination unit.

2. The virtual space presentation device according to claim 1, wherein the virtual viewpoint is disposed at a center of the virtual space,
a direction of the user's visual field from the virtual viewpoint changes in accordance with the orientation of the head-mounted display,
the target region is set on at least one side of the virtual viewpoint in a vertical direction, and
the region control unit makes the range of the target region in a case where the posture determination unit determines that the user's posture is a sleeping posture with the user's face facing the one side in a vertical direction larger than the range of the target region in a case where the posture determination unit does not determine that the user's posture is the sleeping posture.

3. The virtual space presentation device according to claim 2, wherein the posture determination unit determines that the user's posture is the sleeping posture in a case where a state in which a front direction of the head-mounted display detected by the detection unit faces the one side in a vertical direction continues for a predetermined threshold time or more.

4. The virtual space presentation device according to claim 2, wherein the detection unit detects a height position of the head-mounted display in a vertical direction, and
the posture determination unit determines that the user's posture is the sleeping posture in a case where a front direction of the head-mounted display detected by the detection unit at present is facing the one side in a vertical direction, and a difference between a first height position of the head-mounted display detected by the detection unit at present and a second height position of the head-mounted display detected by the detection unit at a startup of the head-mounted display is equal to or greater than a threshold determined in advance.

5. The virtual space presentation device according to claim 2, wherein the posture determination unit determines that the user's posture is the sleeping posture in a case where the vertical direction of the head-mounted display detected by the detection unit at a startup of the head-mounted display is along a horizontal direction.

6. The virtual space presentation device according to claim 1, wherein a function of changing the display direction of the content is configured to be capable of being set to be disabled for each piece of content, and
the display control unit does not control the display direction of content for which the function is set to be disabled among the content disposed in the target region.

7. The virtual space presentation device according to claim 1, wherein, in a case where first content overlaps second content other than the first content when a display direction of the first content disposed in the target region is controlled, the display control unit transmissively displays the first content or the second content.

8. The virtual space presentation device according to claim 1, wherein, in a case where first content overlaps second content other than the first content when a display direction of the first content disposed in the target region is controlled, the display control unit changes disposition of at least one of the first content and the second content so that the first content and the second content do not overlap each other.

9. The virtual space presentation device according to claim 1, wherein the virtual space is shared by a plurality of users,
the virtual viewpoint of each of the plurality of users is disposed at the center of the virtual space,
a visual field direction of each of the plurality of users from the virtual viewpoint changes in accordance with the orientation of the head-mounted display worn on the head of each of the users, and
processes of the detection unit, the display control unit, the posture determination unit, and the region control unit are executed independently for each of the users.

* * * * *